US011410376B2

(12) United States Patent
Murez

(10) Patent No.: US 11,410,376 B2
(45) Date of Patent: Aug. 9, 2022

(54) SYSTEMS AND METHODS FOR END TO END SCENE RECONSTRUCTION FROM MULTIVIEW IMAGES

(71) Applicant: MAGIC LEAP, INC., Plantation, FL (US)

(72) Inventor: Zachary Paul Murez, Venice, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/193,822

(22) Filed: Mar. 5, 2021

(65) Prior Publication Data

US 2021/0279943 A1    Sep. 9, 2021

Related U.S. Application Data

(60) Provisional application No. 62/985,671, filed on Mar. 5, 2020.

(51) Int. Cl.
*G06T 15/08* (2011.01)
*G06N 3/02* (2006.01)

(52) U.S. Cl.
CPC ............... *G06T 15/08* (2013.01); *G06N 3/02* (2013.01); *G06T 2200/08* (2013.01)

(58) Field of Classification Search
CPC ............. G06T 15/08; G06T 2200/08; G06T 2207/10016; G06T 2207/10024; G06T 2207/20081; G06T 2207/20084; G06T 17/00; G06T 7/55; G06N 3/02; G06N 3/0454; G06N 3/082; G06N 3/084
See application file for complete search history.

(56) References Cited

U.S. PATENT DOCUMENTS 8,547,374 B1 * 10/2013 Sadjadi .................. G06T 7/593
382/103
2016/0189419 A1   6/2016 Fakih et al.
2016/0350930 A1   12/2016 Lin et al.
(Continued)

OTHER PUBLICATIONS

Ji et al. "SurfaceNet: An End-toend 3D Neural Network for Multiview Stereopsis." In: Cornell University Library/Computer Science/Computer Vision and Pattern Recognition, Aug. 5, 2017 (Year: 2017).*
(Continued)

*Primary Examiner* — William A Beutel
(74) *Attorney, Agent, or Firm* — Vista IP Law Group, LLP

(57) ABSTRACT

Systems and methods of generating a three-dimensional (3D) reconstruction of a scene or environment surrounding a user of a spatial computing system, such as a virtual reality, augmented reality or mixed reality system, using only multiview images comprising RGB images, and without the need for depth sensors or depth data from sensors. Features are extracted from a sequence of frames of RGB images and back-projected using known camera intrinsics and extrinsics into a 3D voxel volume wherein each pixel of the voxel volume is mapped to a ray in the voxel volume. The back-projected features are fused into the 3D voxel volume. The 3D voxel volume is passed through a 3D convolutional neural network to refine the and regress truncated signed distance function values at each voxel of the 3D voxel volume.

21 Claims, 9 Drawing Sheets
(3 of 9 Drawing Sheet(s) Filed in Color)

(56) References Cited

U.S. PATENT DOCUMENTS

| | | |
|---|---|---|
| 2017/0032222 A1 | 2/2017 | Sharma et al. |
| 2017/0046868 A1 | 2/2017 | Chernov et al. |
| 2017/0206712 A1 | 7/2017 | Petrovskaya et al. |
| 2018/0218513 A1* | 8/2018 | Ho ..................... G06T 7/579 |

OTHER PUBLICATIONS

PCT International Search Report and Written Opinion for International Appln. No. PCT/US21/21188, Applicant Magic Leap, Inc., dated May 20, 2021 (19 pages).

Ji et al. "SurfaceNet: An End-to-end 3D Neural Network for Multiview Stereopsis." In: Cornell University Library/ Computer Science/Computer Vision and Pattern Recognition. Aug. 5, 2017. [online] [retrieved on May 4, 2021 (May 4, 2021)] Retrieved from the Internet <URL:https:llarxiv.org/abs/1708.01749>. entire document.

Xie et al. "Pix2Vox: Context-aware 3D Reconstruction from Single and Multi-view Images." In: Cornell University Library/Computer Science/Computer Vision and Pattern Recognition. Jul. 29, 2019, [online] [retrieved on May 4, 2021 (May 4, 2021)] Retrieved from the Internet <URL: https://arxiv.org/abs/1901.11153>. entire document.

* cited by examiner

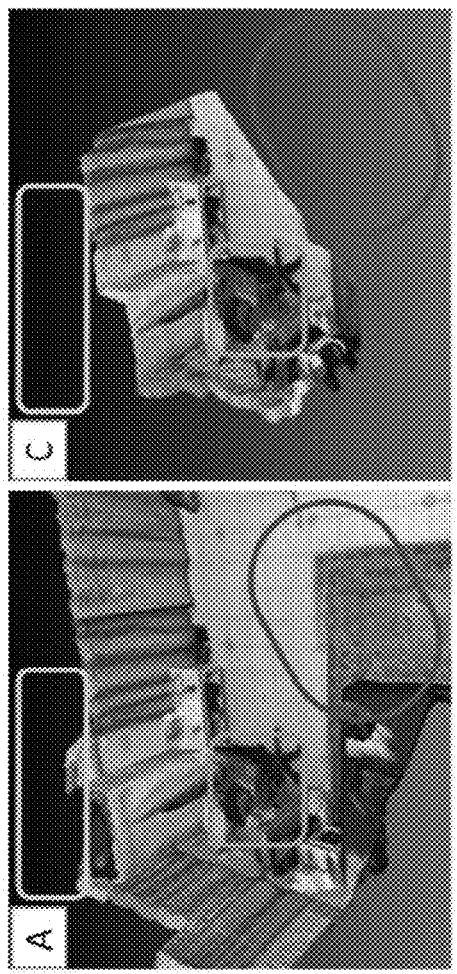
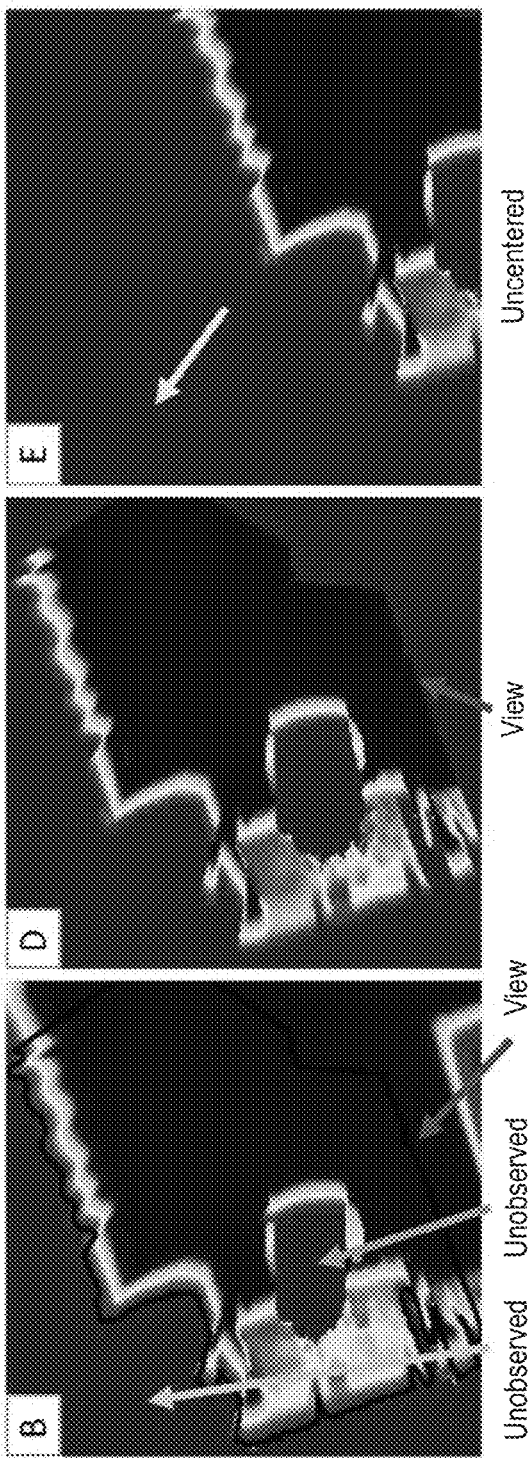
FIG. 6A  FIG. 6C
FIG. 6B  FIG. 6D  FIG. 6E

| Method | AbsRel | AbsDiff | SqRel | RMSE |
|--------|--------|---------|-------|------|
| DPSNet | .147 | .324 | .107 | .426 |
| GPMVS | .101 | .238 | .080 | .295 |
| Ours | .074 | .134 | .048 | .100 |

*FIG. 9*

Let $I_t \in \mathbb{R}^{3 \times h \times w}$ be a sequence of $T$ RGB images. We extract features $F_t = F(I_t) \in \mathbb{R}^{c \times h \times w}$ using a standard 2D CNN where $c$ is the feature dimension. These 2D features are then backprojected into a 3D voxel volume using the known camera intrinsics and extrinsics, assuming a pinhole camera model. Consider a voxel volume $V \in \mathbb{R}^{c \times H \times W \times D}$.

$$V_t(:,i,j,k) = F_t(:,\hat{i},\hat{j}) \quad (1)$$

$$\begin{bmatrix} \hat{i} \\ \hat{j} \end{bmatrix} = \Pi K_t P_t \begin{bmatrix} i \\ j \\ k \\ 1 \end{bmatrix} \quad (2)$$

where $P_t$ and $K_t$ are the extrinsics and intrinsics matrices for image $t$ respectively, $\Pi$ is the perspective mapping and : is the slice operator. Here $(i,j,k)$ are the voxel coordinates in world space and $(\hat{i},\hat{j})$ are the pixel coordinates in image space. Note that this means that all voxels along a camera ray are filled with the same features corresponding to that pixel (see Figs. 4A-4C).

*FIG. 10*

These feature volumes are accumulated over the entire sequence using a weighted running average similar to TSDF fusion.

$$\bar{V}_t = \frac{\bar{V}_{t-1}\bar{W}_{t-1} + V_t}{\bar{W}_{t-1} + W_t}$$

$$\bar{W}_t = \bar{W}_{t-1} + W_t$$

For the weights we use a binary mask $W_t(i,j,k) \in \{0,1\}$ which stores if voxel $(i,j,k)$ is inside or outside the view frustum of the camera.

FIG. 11

$$z = \begin{cases} x + g(f(y)) & y \neq 0 \\ x + g(x) & y = 0 \end{cases}$$

wherein: x is the features from the decoder
y is the features being skipped from the encoder
f is the convolution
g is the bathnorm and relu functions

FIG. 12

SYSTEMS AND METHODS FOR END TO END SCENE RECONSTRUCTION FROM MULTIVIEW IMAGES

CROSS REFERENCE TO RELATED APPLICATIONS

The present application claims benefit under 35 U.S.C. § 119 to U.S. Provisional Patent Application Ser. No. 62/985,671 filed on Mar. 5, 2020, entitled "SYSTEMS AND METHODS FOR END TO END SCENE RECONSTRUCTION FROM MULTIVIEW IMAGES," the contents of which are hereby incorporated by reference into the present application in their entirety as though set forth in full.

FIELD OF THE INVENTION

This invention is related to computing, learning network configurations, and connected mobile computing systems, methods, and configurations, and more specifically to systems and methods for generating three-dimensional reconstructions of a scene from multiview images which may be utilized in mobile computing systems, methods, and configurations having at least one wearable component configured for virtual and/or augmented reality operation.

BACKGROUND

Modern computing and display technologies have facilitated the development of systems for so called "virtual reality" ("VR"), "augmented reality" ("AR"), and/or "mixed reality" ("MR") environments or experiences, referred to collectively as "cross-reality" environments or experiences. This can be done by presenting computer-generated imagery to a user through a head-mounted display. This imagery creates a sensory experience which immerses the user in a simulated environment. This data may describe, for example, virtual objects that may be rendered in a way that users' sense or perceive as a part of a physical world and can interact with the virtual objects. The user may experience these virtual objects as a result of the data being rendered and presented through a user interface device, such as, for example, a head-mounted display device. The data may be displayed to the user to see, or may control audio that is played for the user to hear, or may control a tactile (or haptic) interface, enabling the user to experience touch sensations that the user senses or perceives as feeling the virtual object.

XR systems may be useful for many applications, spanning the fields of scientific visualization, medical training, engineering design and prototyping, tele-manipulation and tele-presence, and personal entertainment. VR systems typically involve presentation of digital or virtual image information without transparency to actual real-world visual input.

AR systems generally supplement a real-world environment with simulated elements. For example, AR systems may provide a user with a view of a surrounding real-world environment via a head-mounted display. Computer-generated imagery can also be presented on the head-mounted display to enhance the surrounding real-world environment. This computer-generated imagery can include elements which are contextually-related to the surrounding real-world environment. Such elements can include simulated text, images, objects, and the like. MR systems also introduce simulated objects into a real-world environment, but these objects typically feature a greater degree of interactivity than in AR systems.

AR/MR scenarios often include presentation of virtual image elements in relationship to real-world objects. For example, an AR/MR scene is depicted wherein a user of an AR/MR technology sees a real-world scene featuring the environment surrounding the user, including structures, objects, etc. In addition to these features, the user of the AR/MR technology perceives that they "see" computer generated features (i.e., virtual object), even though such features do not exist in the real-world environment. Accordingly, AR and MR, in contrast to VR, include one or more virtual objects in relation to real objects of the physical world. The virtual objects also interact with the real world objects, such that the AR/MR system may also be termed a "spatial computing" system in relation to the system's interaction with the 3D world surrounding the user. The experience of virtual objects interacting with real objects greatly enhances the user's enjoyment in using the AR/MR system, and also opens the door for a variety of applications that present realistic and readily understandable information about how the physical world might be altered.

The visualization center of the brain gains valuable perception information from the motion of both eyes and components thereof relative to each other. Vergence movements (i.e., rolling movements of the pupils toward or away from each other to converge the lines of sight of the eyes to fixate upon an object) of the two eyes relative to each other are closely associated with accommodation (or focusing) of the lenses of the eyes. Under normal conditions, accommodating the eyes, or changing the focus of the lenses of the eyes, to focus upon an object at a different distance will automatically cause a matching change in vergence to the same distance, under a relationship known as the "accommodation-vergence reflex." Likewise, a change in vergence will trigger a matching change in accommodation, under normal conditions. Working against this reflex, as do most conventional stereoscopic VR/AR/MR configurations, is known to produce eye fatigue, headaches, or other forms of discomfort in users.

Stereoscopic wearable glasses generally feature two displays—one for the left eye and one for the right eye—that are configured to display images with slightly different element presentation such that a three-dimensional perspective is perceived by the human visual system. Such configurations have been found to be uncomfortable for many users due to a mismatch between vergence and accommodation ("vergence-accommodation conflict") which must be overcome to perceive the images in three dimensions. Indeed, some users are not able to tolerate stereoscopic configurations. These limitations apply to VR, AR, and MR systems. Accordingly, most conventional VR/AR/MR systems are not optimally suited for presenting a rich, binocular, three-dimensional experience in a manner that will be comfortable and maximally useful to the user, in part because prior systems fail to address some of the fundamental aspects of the human perception system, including the vergence-accommodation conflict.

Various systems and methods have been disclosed for addressing the vergence-accommodation conflict. For example, U.S. Utility patent application Ser. No. 14/555,585 discloses VR/AR/MR systems and methods that address the vergence-accommodation conflict by projecting light at the eyes of a user using one or more light-guiding optical elements such that the light and images rendered by the light appear to originate from multiple depth planes. All patent applications, patents, publications, and other references referred to herein are hereby incorporated by reference in their entireties, and for all purposes. The light-guiding optical elements are designed to in-couple virtual light corresponding to digital or virtual objects, propagate it by total internal reflection ("TIR"), and then out-couple the virtual light to display the virtual objects to the user's eyes. In AR/MR systems, the light-guiding optical elements are also designed to be transparent to light from (e.g., reflecting off of) actual real-world objects. Therefore, portions of the light-guiding optical elements are designed to reflect virtual light for propagation via TIR while being transparent to real-world light from real-world objects in AR/MR systems.

AR/MR scenarios often include interactions between virtual objects and a real-world physical environment. Similarly, some VR scenarios include interactions between completely virtual objects and other virtual objects. Delineating objects in the physical environment facilitates interactions with virtual objects by defining the metes and bounds of those interactions (e.g., by defining the extent of a particular structure or object in the physical environment). For instance, if an AR/MR scenario includes a virtual object (e.g., a tentacle or a fist) extending from a particular object in the physical environment, defining the extent of that object in three dimensions allows the AR/MR system to present a more realistic AR/MR scenario. Conversely, if the extent of objects are not defined or inaccurately defined, artifacts and errors will occur in the displayed images. For instance, a virtual object may appear to extend partially or entirely from midair adjacent an object instead of from the surface of the object. As another example, if an AR/MR scenario includes a virtual character walking on a particular horizontal surface in a physical environment, inaccurately defining the extent of the surface may result in the virtual character appearing to walk off of the surface without falling, and instead floating in midair.

Hence, in order to provide an accurate and effective three-dimensional (3D) XR experience, the XR system needs to be able to accurately, and with efficient computation (e.g., in near real-time), generate a 3D reconstruction of the surrounding environment. Indeed, reconstructing the world around us has been a long-standing goal of computer vision.

Reconstructing a 3D model of a scene usually involves acquiring depths of features for a sequence of images and fusing the depth maps using a 3D data structure. The most common 3D structure for depth accumulation is the voxel volume used by TSDF fusion. However, surfels (oriented point clouds) are starting to gain popularity. These methods are usually used with a physical depth sensor, but can also be applied to depth maps predicted from monocular or stereo images.

With the rise of deep learning, monocular depth estimation has seen huge improvements, however its accuracy is still far below state-of-the-art stereo methods. A popular classical approach to stereo uses mutual information and semi global matching to compute the disparity between two images. More recently, several end-to-end plane sweep algorithms have been proposed, such as DeepMVS which uses a patch matching network, and MVDepthNet which construct the cost volume from raw pixel measurements and perform 2D convolutions, treating the planes as feature channels. GPMVS builds upon this and aggregates information into the cost volume over long sequences using a Gaussian process. MVSNet and DPSNet construct the cost volume from features extracted from the images using a 2D CNN. They then filter the cost volume using 3D convolutions on the 4D tensor. All of these methods require choosing a target image to predict depth for and then finding suitable neighboring reference images.

Recent binocular stereo methods use a similar cost volume approach, but avoid frame selection by using a fixed baseline stereo pair. Depth maps over a sequence are computed independently (or weakly coupled in some cases). In contrast to these approaches, the method of the present invention constructs a single coherent 3D model from a sequence of input images directly.

While TSDF fusion is simple and effective, it cannot reconstruct partially occluded geometry and requires averaging many measurements to reduce noise. As such, learned methods have been proposed to improve the fusion. Oct-NetFusion uses a 3D encoder-decoder to aggregate multiple depth maps into a TSDF and shows results on single objects and portions of scans. ScanComplete builds upon this and shows results for entire rooms. SG-NN improves upon ScanComplete by increasing the resolution using sparse convolutions and training using a novel self-supervised training scheme. 3D-SIC focuses on 3D instance segmentation using region proposals and adds a per instance completion head. Routed fusion uses 2D filtering and 3D convolutions in view frustums to improve aggregation of depth maps.

Some networks have been disclosed which take one or more images and directly predict a 3D representation. For example, 3D-R2N2 encodes images to a latent space and then decodes a voxel occupancy volume. Octtree-Gen increases the resolution by using an octtree data structure to improve the efficiency of 3D voxel volumes. Deep SDF chooses to learn a generative model that can output an SDF value for any input position instead of discretizing the volume. Point set generating networks have been disclosed which learn to generate point clouds with a fixed number of points. Pixel2Mesh++ uses a graph convolutional network to directly predict a triangulated mesh. These methods encode the input to a small latent code and report results on single objects, mostly from Shapenet. As such it is not clear how to extend them to work on full scene reconstructions. Mesh-RCNN builds upon 2D object detection and adds an additional head to predict a voxel occupancy grid for each instance and then refines them using a graph convolutional network on a mesh.

Back-projecting image features into a voxel volume and then refining them using a 3D CNN has also been used for human pose estimation. These works regress 3D heat maps that are used to localize joint locations.

Deep Voxels and the follow up work of scene representation networks accumulate features into a 3D volume forming an unsupervised representation of the world which can then be used to render novel views without the need to form explicit geometric intermediate representations.

Other approaches to 3D reconstruction use monocular, binocular or multiview stereo methods which take red green blue (RGB) images (one, two, or multiple, respectively) from image sensors and predict depth maps for the images. For example, methods of using monocular stereo methods using RGB images to generate 3D reconstructions are disclosed in the following publications: Fu, H., Gong, M., Wang, C. Batmanhelich, K., Tao, D.: Deep ordinal regression network for monocular depth estimation; Proceedings of the IEEE Conference on Computer Vision and Pattern Recognition, pp. 2002-2011 (2018); Lasinger, K., Ranftl, R., Schindler, K., Koltun, V.: Towards robust monocular depth estimation: Mixing datasets for zero-shot cross-dataset transfer; arXiv preprint arXiv: 1907.01341 (2019); and, Lee, J. H., Hang, M. K., Ko, D. W., Suh, I. H.: From big to small:

Multi-scale local planar guidance for monocular depth estimation; arXiv preprint arXiv: 1907.10326 (2019). Certain methods of using binocular stereo methods using RGB images to generate 3D reconstructions are disclosed in the following publications: Chabra, R., Straub, J., Sweeney, C., Newcombe, R., Fuchs, H.: Stereodrnet: Dilated residual stereonet; Proceedings of the IEEE Conference on Computer Vision and Pattern Recognition; pp. 11786-11795 (2019); and, Chang, A. X., Funkhouser, T., Guibas, L., Hanrahan, P., Huang, Q. Li, Z., Savarese, S., Savva, M., Song, S., Su, H., et al.; Shapenet: An information-rich 3d model repository; arXiv preprint arXiv: 1512.00312 (2015). And, various methods of using multiview stereo methods using RGB images to generate 3D reconstructions are disclosed in the following publications: Hirschmuller, H.: Stereo processing by semiglobal matching and mutual information; IEEE Transaction on pattern analysis and machine intelligence 30(2), 328-341 (2007); Huang, P. H., Matzen, K., Kopf, J., Ahuja, N., Huang, J. B.; Deepmvs: Learning multi-view stereopsis; Proceedings of the IEEE Conference on Computer Vision and Pattern Recognition; pp. 2821-2830 (2018); I, S., Jeon, H. G., Lin, S., Kweon, I. S.; DPSnet: End-to-end deep plane sweep stereo; 7th International Conference on Learning Representations, ICLR 2019; International Conference on Learning Representations, ICLR (2019); and, Want, K., Shen, S.; Mvdepthnet: real-time multiview depth estimation neural network; 2018 International Conference on Computer Vision; pp. 2088-2096 (2017). However, despite the plethora of recent research, these methods of generating 3D reconstructions using only RGB images are still much less accurate than depth sensors, and do not produce satisfactory results when fused into a 3D model.

In addition to reconstructing geometry, many XR applications require 3D semantic labeling (i.e., 3D semantic segmentation) of the 3D reconstruction to provide a richer representation. In general, there are two approaches to solving this problem: 1) Predict semantics on 2D input images using a 2D segmentation network and back-project the labels to 3D; and 2) Directly predict the semantic labels in the 3D space. All of these methods assume depth is provided by a depth sensor. A notable exception is Kimera, which uses multiview stereo to predict depth, however, results have only been shown on synthetic data and ground truth 2D segmentations.

SGPN formulates instance segmentation as a 3D point cloud clustering problem. Predicting a similarity matrix and clustering the 3D point cloud to derive semantic and instance labels. 3D-SIS improves upon these approaches by fusing 2D features in a 3D representation. RGB images are encoded using a 2D CNN and back-projected onto the 3D geometry reconstructed from depth maps. A 3D CNN is then used to predict 3D object bounding boxes and semantic labels. SSCN predicts semantics on a high resolution voxel volume enabled by sparse convolutions.

Accordingly, there is a need for more efficient and accurate methods and systems for generating 3D reconstructions of scenes in an end-to-end manner using RGB images and without the need for depth sensors. Furthermore, there is a need for such 3D reconstructions to be usable in presenting virtual image information on an XR display in multiple focal planes (for example, two or more) in order to be practical for a wide variety of use-cases without exceeding an acceptable allowance for vergence-accommodation mismatch. In addition, there is a need for the XR system to implement displays which are lightweight, low-cost, have a small form-factor, have a wide virtual image field of view, and are as transparent as possible. Moreover, there is also a need for 3D semantic segmentation of the 3D reconstructions without the use of depth sensors.

SUMMARY

The embodiments disclosed herein are directed to systems and methods of generating a three-dimensional (3D) reconstruction of a scene or environment surrounding a user of a spatial computing system, such as an XR system, using only multiview images comprising RGB images, and without the need for depth sensors or depth data from sensors. The 3D reconstruction can be utilized by a spatial computing system, for example, to provide an accurate and effective 3D XR experience. The resulting 3D XR experience is displayable in a rich, binocular, three-dimensional experience that is comfortable and maximally useful to the user, in part because it can present images in a manner which addresses some of the fundamental aspects of the human perception system, such as the vergence-accommodation mismatch. For instance, the 3D reconstruction having accurate depth data enables the 3D images to be displayed in multiple focal planes. The 3D reconstruction also enables accurate management of interactions between virtual objects, other virtual objects, and/or real world objects.

Accordingly, one embodiment of the present invention is directed to a method of generating a three-dimensional (3D) reconstruction of a scene using multiview images. First, a sequence of frames of red green blue (RGB) images is obtained. This may be accomplished by one or more suitable cameras. Features are then extracted from the sequence of frames of RGB images using a two-dimensional convolutional neural network (2D CNN). The extracted features from each frame are then back-projected using known camera intrinsics and extrinsics into a 3D voxel volume wherein each pixel of the voxel volume is mapped to a ray in the voxel volume. In contrast to previous methods of generating a 3D reconstructions using monocular, binocular and multiview images which require choosing a target image to predict depth for and then finding suitable neighboring reference images, this process avoids the need to choose a target image and allows the fusion of an entire sequence of frames into a single volume.

The back-projected features from each frame are accumulated (i.e., fused) into the 3D voxel volume. The 3D voxel volume is passed through a 3D convolutional neural network (3D CNN) having an encoder-decoder to refine the features in the 3D voxel volume. The 3D CNN also regresses output truncated signed distance function (TSDF) values at each voxel of the 3D voxel volume.

In another aspect, the frames may be fused into a single 3D feature volume using a running average, such as a simple running average or a weighted running average.

In another aspect, the method may further comprise, after passing the 3D voxel volume through all layers of the 3D CNN, passing the refined features in the 3D voxel volume and TSDF values at each voxel of the 3D voxel volume through a batch normalization (batchnorm) function and a rectified linear unit (reLU) function.

In still another aspect of the method, the 3D CNN may include additive skip connections from the encoder to the decoder of the 3D CNN. Then, the method uses the additive skip connections to skip one or more features in the 3D voxel volume from the encoder to the decoder of the 3D CNN.

In yet another aspect, the method may be configured to handle null voxels in the 3D voxel volume which do not have features back-projected into them. For instance, the null voxels may correspond to voxels which were not observed during the sequence of frames of RGB images. In such case, the method further comprises not using the additive skip connections from the encoder for the null voxels, and passing the null voxels through the batchnorm function and reLU function to match the magnitude of the voxels undergoing the skip connections.

In another aspect of the method, the 3D CNN may have a plurality of layers each having a set of 3×3×3 residual blocks, the 3D CNN may implement downsampling with a 3×3×3 stride 2 convolution, and upsampling may use trilinear interpolation followed by a 1×1×1 convolution.

In another aspect of the method, the 3D CNN further comprises an additional head for predicting semantic segmentation. The method further comprises the 3D CNN predicting semantic segmentation of the features in the 3D voxel volume.

In another aspect, the method further comprises training the 2D CNN using short frame sequences covering portions of scenes. The short frame sequences may include ten or fewer frame sequences. In still another aspect, the training of the 2D CNN may be fine-tuned using larger frame sequences having more frame sequences than the short frame sequences. The larger frame sequences may include 100 or more frame sequences, for example.

Another disclosed embodiment is directed to a cross reality system which is configured to generate a 3D reconstruction of a scene or environment surrounding a user of the cross reality system, using only multiview images comprising RGB images, and without the need for depth sensors or depth data from sensors. The cross reality system comprises a head-mounted display device having a display system. For example, the head-mounted display may have a pair of near-eye displays in an eyeglasses-like structure. A computing system is in operable communication with the head-mounted display. A plurality of camera sensors are in operable communication with the computing system. For instance, the camera sensors may be mounted on the head-mounted display, or on any other suitable structure. The computing system is configured to generate a three-dimensional (3D) reconstruction of the scene from the sequence of frames of RGB images by a process including any configuration of the methods described above. In additional aspects of the cross reality system, the process may include any one or more of the additional aspects of the method described above. For example, the process may include obtaining a sequence of a frames of red green blue (RGB) images of a scene within a field of view of the camera sensors from the camera sensors. Features from the sequence of frames of RGB images are extracted using a two-dimensional convolutional neural network (2D CNN). The features from each frame are back-projected using known camera intrinsics and extrinsics into a 3D voxel volume wherein each pixel of the voxel volume is mapped to a ray in the voxel volume. The features from each frame are fused into the 3D voxel volume. The 3D voxel volume is passed through a 3D convolutional neural network (3D CNN) having an encoder-decoder to refine the features in the 3D voxel volume and regress output truncated signed distance function (TSDF) values at each voxel of the 3D voxel volume.

The cross reality system may then utilize the 3D reconstruction to generate a 3D XR experience displayed in a rich, binocular, three-dimensional experience, such as displaying 3D images in multiple focal planes on the head-mounted display. The cross reality system may also utilize the 3D reconstruction to manage interactions between virtual objects, other virtual objects, and/or real world objects.

BRIEF DESCRIPTION OF THE DRAWINGS

This patent or application file contains at least one drawing executed in color. Copies of this patent or patent application publication with color drawing(s) will be provided by the Office upon request and payment of the necessary fee.

The drawings illustrate the design and utility of preferred embodiments of the present disclosure, in which similar elements are referred to by common reference numerals. In order to better appreciate how the above-recited and other advantages and objects of the present disclosure are obtained, a more particular description of the present disclosure briefly described above will be rendered by reference to specific embodiments thereof, which are illustrated in the accompanying drawings. Understanding that these drawings depict only typical embodiments of the disclosure and are not therefore to be considered limiting of its scope, the disclosure will be described and explained with additional specificity and detail through the use of the accompanying drawings.

FIGS. 6A-6E are a series of images illustrating the preparation of a ground truth for training the CNNs in the Examples described herein.

FIG. 9 is a table comparing the 3D reconstruction generated in the described Example according to the methods disclosed herein, against 3D reconstructions according to DPSNet and GPMVS, using standard 2D depth metrics and 3D metrics.

FIG. 10 sets forth a process for passing a sequence of images through a 2D CNN backbone to extract features and back-projecting the features into a 3D voxel volume, according to one embodiment.

FIG. 11 sets forth a process for accumulating feature volumes over an entire sequence of images using a weighted running average, according to one embodiment.

FIG. 12 sets forth an equation representing an exemplary skip connection, according to one embodiment.

DETAILED DESCRIPTION

The following describes various embodiments of systems and methods for generating a three-dimensional (3D) reconstruction of a scene or environment surrounding a user of a spatial computing system, such as an XR system, which utilize multiview RGB images, and without using depth or distance sensors, in an end-to-end reconstruction. The various embodiments are described in detail with reference to the drawings, which are provided as illustrative examples of the disclosure to enable those skilled in the art to practice the disclosure. Notably, the figures and the examples below are not meant to limit the scope of the present disclosure. Where certain elements of the present disclosure may be partially or fully implemented using known components (or methods or processes), only those portions of such known components (or methods or processes) that are necessary for an understanding of the present disclosure will be described, and the detailed descriptions of other portions of such known components (or methods or processes) will be omitted so as not to obscure the disclosure. Further, various embodiments encompass present and future known equivalents to the components referred to herein by way of illustration.

Furthermore, the systems and methods for generating a three-dimensional (3D) reconstruction of a scene or environment surrounding a user of a spatial computing system may also be implemented independently of XR systems, and the embodiments depicted herein are described in relation to AR/MR systems for illustrative purposes only.

Figure 1:
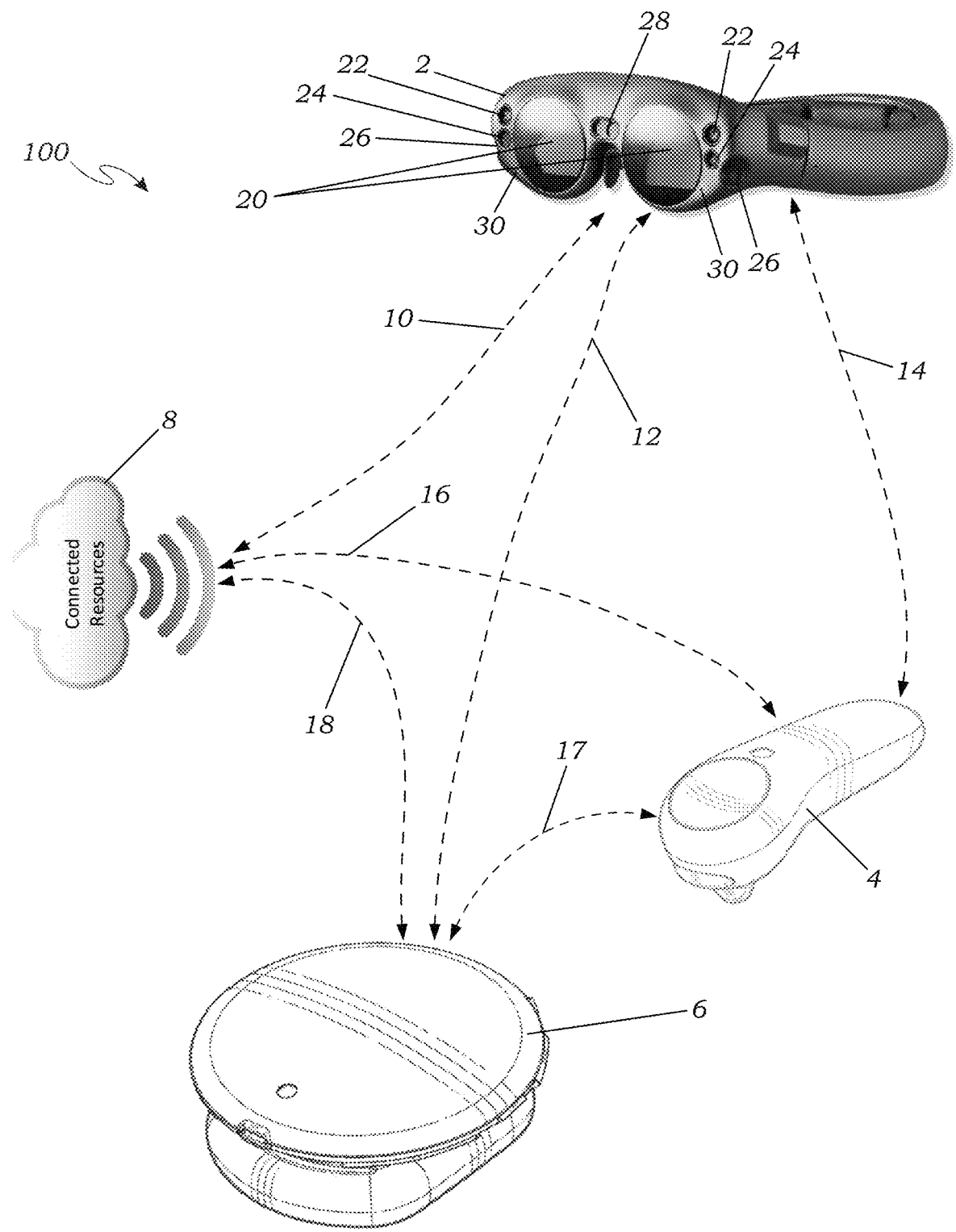
FIG. 1 is a schematic diagram of an exemplary cross reality system for providing a cross reality experience, according to one embodiment.

Referring to FIG. 1, an exemplary XR system 100 according to one embodiment is illustrated. The XR system 100 includes a head-mounted display device 2 (also referred to as a head worn viewing component 2), a hand-held controller 4 (also referred to as a hand-held controller component 4), and an interconnected auxiliary computing system or controller 6 (also referred to as an interconnected auxiliary computing system or controller component 6) which may be configured to be worn as a belt pack or the like on the user. Each of these components are in operable communication (i.e., operatively coupled) o each other and to other connected resources 8 (such as cloud computing or cloud storage resources) via wired or wireless communication connections 10, 12, 14, 16, 17, 18, such as those specified by IEEE 802.11, Bluetooth®, and other connectivity standards and configurations. The head-mounted display device includes two depicted optical elements 20 through which the user may see the world around them along with video images and visual components produced by the associated system components, including a pair of image sources (e.g., micro-display panels) and viewing optics for displaying computer generated images on the optical elements 20, for an augmented reality experience. As illustrated in FIG. 1, the XR system 100 also includes various sensors configured to provide information pertaining to the environment around the user, including but not limited to various camera type sensors 22, 24, 26 (such as monochrome, color/RGB, and/or thermal), depth camera sensors 28, and/or sound sensors 30 (such as microphones). U.S. patent application Ser. Nos. 14/555,585, 14/690,401, 14/331,218, 15/481,255, 62/627,155, 62/518,539, 16/229,532, 16/155,564, 15/413,284, 16/020,541, 62/702,322, 62/206,765, 15/597,694, 16/221,065, 15/968,673, and 62/682,788, each of which is incorporated by reference herein in its entirety, describe various aspects of the XR system 100 and its components in more detail.

In various embodiments a user wears an augmented reality system such as the XR system 100 depicted in FIG. 1, which may also be termed a "spatial computing" system in relation to such system's interaction with the three dimensional world around the user when operated. The cameras 22, 24, 26 are configured to map the environment around the user, and/or to create a "mesh" of such environment, comprising various points representative of the geometry of various objects within the environment around the user, such as walls, floors, chairs, and the like. The spatial computing system may be configured to map or mesh the environment around the user, and to run or operate software, such as that available from Magic Leap, Inc., of Plantation, Fla., which may be configured to utilize the map or mesh of the room to assist the user in placing, manipulating, visualizing, creating, and modifying various objects and elements in the three-dimensional space around the user. As shown in FIG. 1, the XR system 100 may also be operatively coupled to additional connected resources 8, such as other computing systems, by cloud or other connectivity configurations.

It is understood that the methods, systems and configurations described herein are broadly applicable to various scenarios outside of the realm of wearable spatial computing such as the XR system 100, subject to the appropriate sensors and associated data being available.

One of the challenges in spatial computing relates to the utilization of data captured by various operatively coupled sensors (such as elements 22, 24, 26, 28 of the system 100 of FIG. 1) of the XR system 100 in making determinations useful and/or critical to the user, such as in computer vision and/or object recognition challenges that may, for example, relate to the three-dimensional world around a user. Disclosed herein are methods and systems for generating a 3D reconstruction of a scene, such as the 3D environment surrounding the user of the XR system 100, using only RGB images, such as the RGB images from the cameras 22, 24, and 26, without using depth data from the depth sensors 28.

In contrast to previous methods of generating 3D reconstructions using only RGB images described above which produce relatively inaccurate depths, and relatively unsatisfactory 3D image models, the methods and systems disclosed herein produce accurate, full 3D models, and also supports efficient computation of other reconstruction data, including semantic segmentation.

Figure 2:
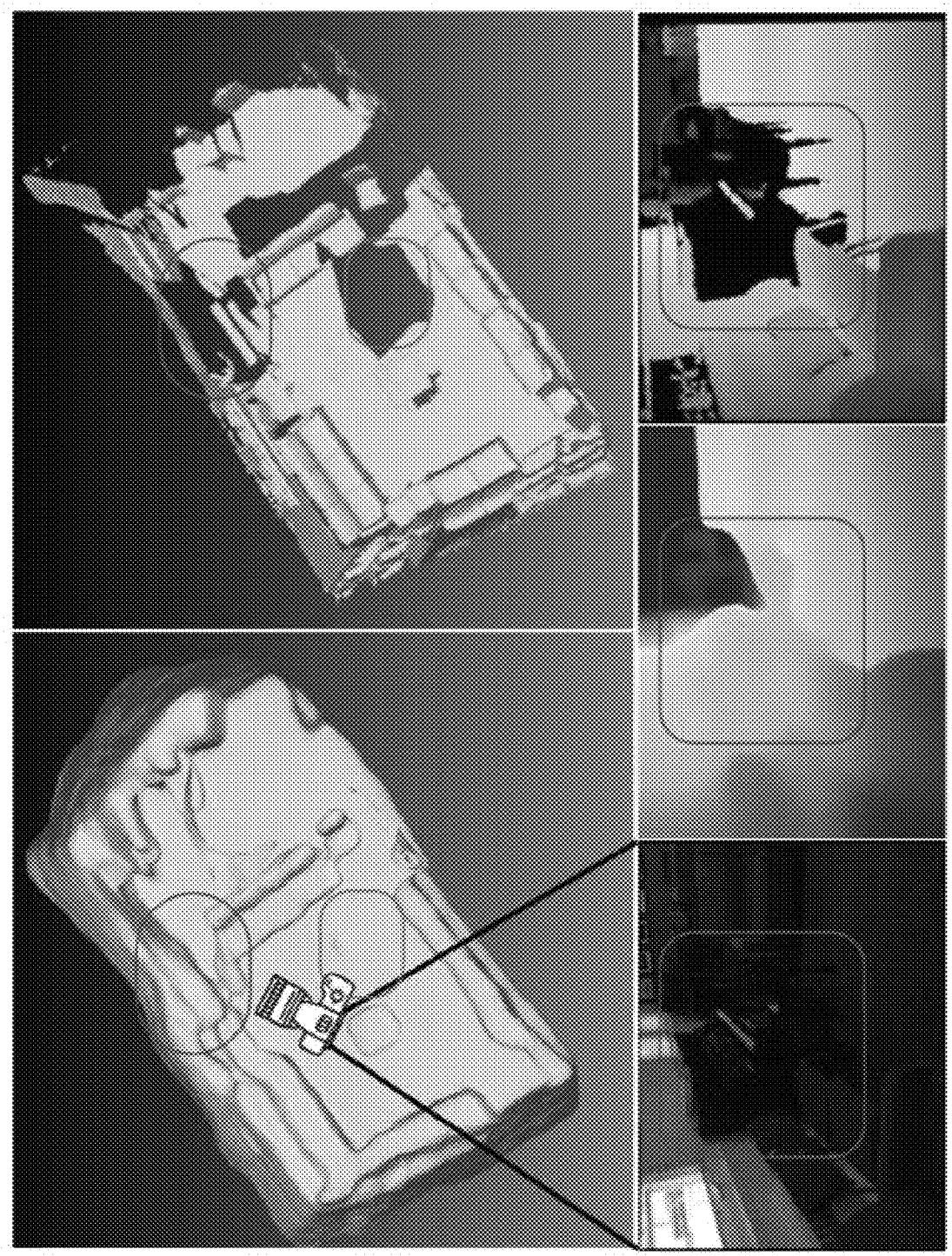
FIG. 2 shows a comparison of an evaluation performed on Scannet of a 3D reconstruction performed according to an embodiment of one embodiment of the method disclosed herein compared to a baseline method utilizing a deep multiview stereo followed by traditional TSDF fusion.

In general, an approach to directly regress a truncated distance function ("TSDF") for a set of posed RGB images is disclosed. A two-dimensional (2D) CNN (convolutional neural network) is configured to extract features from each image independently. These features are back-projected and accumulated into a voxel volume using the camera intrinsics and extrinsics (each pixel's features are placed along the entire ray). After accumulation, the voxel volume is passed through a three-dimensional (3D) CNN configured to refine the features and predict the TSDF values. Additional heads may be added to predict color, semantic, and instance labels with minimal extra compute resource. As explained in more detail herein, this method was evaluated on Scannet, and such method was determined to significantly outperform state-of-the-art baselines (deep multiview stereo followed by traditional TSDF fusion) both quantitatively and qualitatively, as shown in FIG. 2. The resulting 3D semantic segmentation was compared to prior methods that use a depth sensor since no previous work attempts to solve the problem with only RGB input. The presently disclosed methods and configurations are broadly applicable to various scenarios outside of the realm of wearable spatial computing, subject to the appropriate sensors and associated data being available.

It is observed that depth maps are typically just intermediate representations that are then fused with other depth maps into a full 3D model. By contrast, the presently disclosed method takes a sequence of RGB images and directly predicts a full 3D model in an end-to-end trainable manner. This allows the network to fuse more information and learn better geometric priors about the world, producing much better reconstructions. Furthermore, it reduces the complexity of the system by eliminating steps like frame selection, as well as reducing the required compute by amortizing the cost over the entire sequence.

The presently disclosed method begins by obtaining a sequence of frames of RGB images, such as images obtained by the cameras 22, 24 and 26, or other suitable cameras. Then, features from each of the frames is extracted using a 2D CNN. These features are then back-projected into a 3D volume using the known camera intrinsics and extrinsics. However, unlike previous cost volume approaches which back-project the features into a target view frustum using image warping, the present method back-projects the features from each frame into a canonical 3D voxel volume, where each pixel gets mapped to a ray in the volume. This process avoids the need to choose a target image and allows the fusion of an entire sequence of frames into a single volume. Then, each of the features in all of the frames are fused into the 3D voxel volume using a simple running average. Then, the 3D voxel volume is passed through a 3D convolutional encoder-decoder to refine the features. Finally, the resulting 3D voxel feature volume is used to regress the TSDF values at each voxel.

The networks are trained and evaluated on real scans of indoor rooms from the Scannet and RIO datasets. As shown herein, the presently disclosed method significantly outperforms state-of-the-art multiview stereo baselines by producing accurate and complete meshes. Furthermore, since the presently disclosed method only requires running the large 3D CNN once at the end of a sequence, the total compute required to generate a mesh of the entire scene is much lower than previous multiview stereo methods.

As an additional bonus, for minimal extra compute, an additional head is added to the 3D CNN to also predict semantic segmentation. While the problems of 3D semantic and instance segmentation have received a lot of attention recently, all previous methods assume the depth was acquired using a depth sensor. Although the 3D segmentations disclosed herein are not competitive with the top performers on the Scannet benchmark leader board, the 3D segmentation establishes a strong baseline for the new task of 3D semantic segmentation from 3D reconstructions from multiview RGB images.

Figure 3:
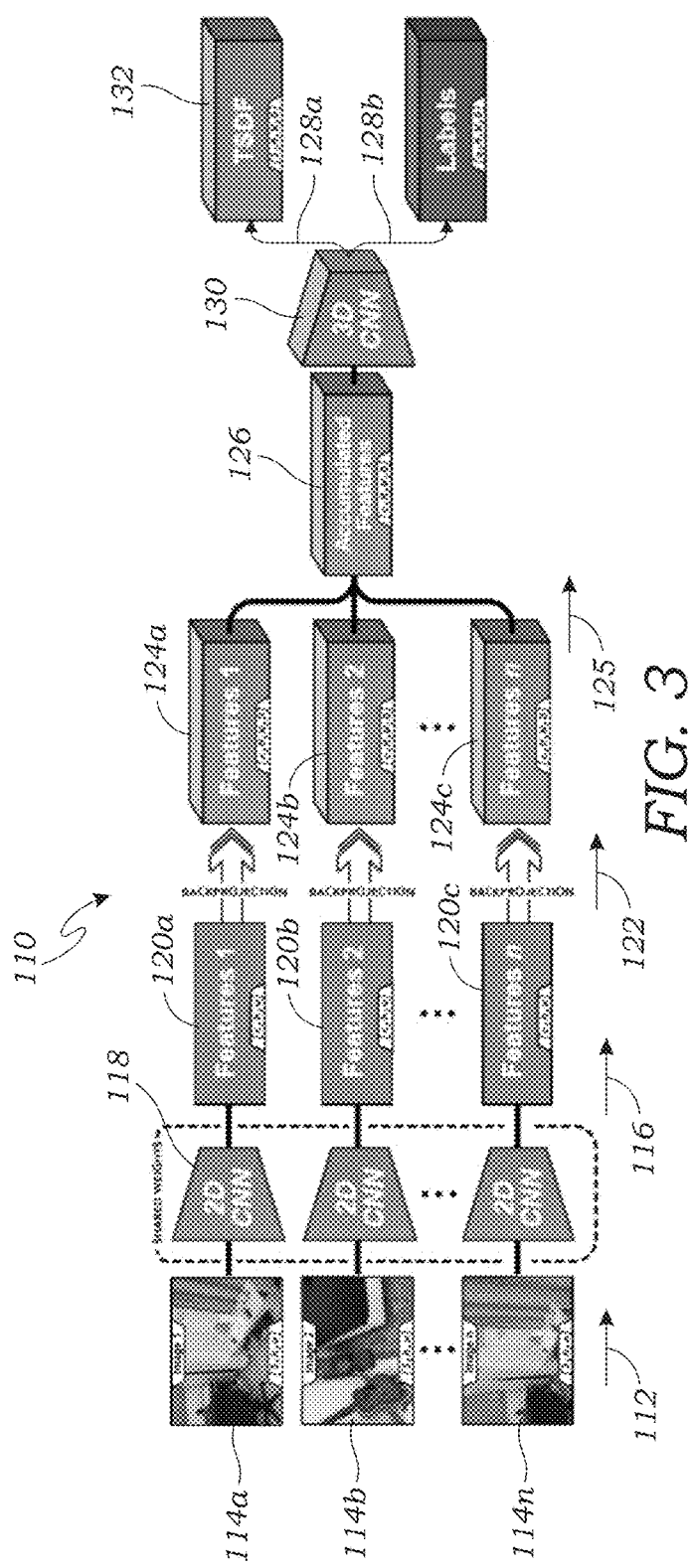
FIG. 3 is a flow chart illustrating a method of generating a 3D reconstruction of a scene using RGB images, according to one embodiment.

Referring to FIG. 3, a schematic of one embodiment of the present method 110 is depicted. At step 112, the method 110 takes as input an arbitrary length sequence of RGB images 114, each with known camera intrinsics and pose. At step 116, these images 114a, 114b, 114c are passed through a 2D CNN 118 backbone to extract features 120. This step 116 is depicted in Equation (1) of FIG. 10. As illustrated in FIG. 10, the 2D features are then backprojected into a 3D voxel volume using the known camera intrinsics and extrinsics, assuming a pinhole camera model. The process of FIG. 10 results in all voxels along a camera ray being filled with the same features corresponding to that pixel (see FIGS. 4A-4C). At step 122, the features 120a, 120b, 120c are then back-projected into a respective 3D voxel volume 124. This step 122 is depicted in Equation (2) of FIG. 10. FIG. 10 is quoted below.

Let $I_t \in \mathbb{R}^{3 \times h \times w}$ be a sequence of T RGB images. We extract features $F_t = F(I_t) \in \mathbb{R}^{c \times h \times w}$ using a standard 2D CNN where c is the feature dimension. These 2D features are then backprojected into a 3D voxel volume using the known camera intrinsics and extrinsics, assuming a pinhole camera model. Consider a voxel volume $V \in \mathbb{R}^{c \times H \times W \times D}$.

$$V_t(:, i, j, k) = F_t(:, \hat{i}, \hat{j}) \quad (1)$$

$$\begin{bmatrix} \hat{i} \\ \hat{j} \end{bmatrix} = \prod K_t P_t \begin{bmatrix} i \\ j \\ k \\ 1 \end{bmatrix} \quad (2)$$

where $P_t$ and $K_t$ are the extrinsics intrinsics matrices for image respectively, H is the perspective mapping and: is the slice operator. Here (i, j, k) are the voxel coordinates in world space and ($\hat{i}$, $\hat{j}$) are the pixel coordinates in image space. Note that this means that all voxels along a camera ray are filled with Still referring to FIG. 3, at step 125, the features 120a, 120b, and 120c are accumulated using a running average into a 3D voxel volume 126. This step 124 is depicted in Equations (3) and (4) of FIG. 11, which is quoted below.

These feature volumes are accumulated over the entire sequence using a weighted running average similar to TSDF fusion.

$$\overline{V}_t = \frac{\overline{V}_{t-1} \overline{W}_{t-1} + V_t}{\overline{W}_{t-1} + W_t} \quad (3)$$

$$\overline{W}_t = \overline{W}_{t-1} + W_t \quad (4)$$

For the weights we use a binary mask $W_t(i, j, k) \in \{0, 1\}$ which stores if voxel (i, j, k) is inside or outside the view frustum of the camera.

The feature volumes are accumulated over the entire sequence using a weighted running average similar to TSDF fusion. For the weights, a binary mask which stores if a voxel is inside or outside the view frustum of the camera.

Figure 5:
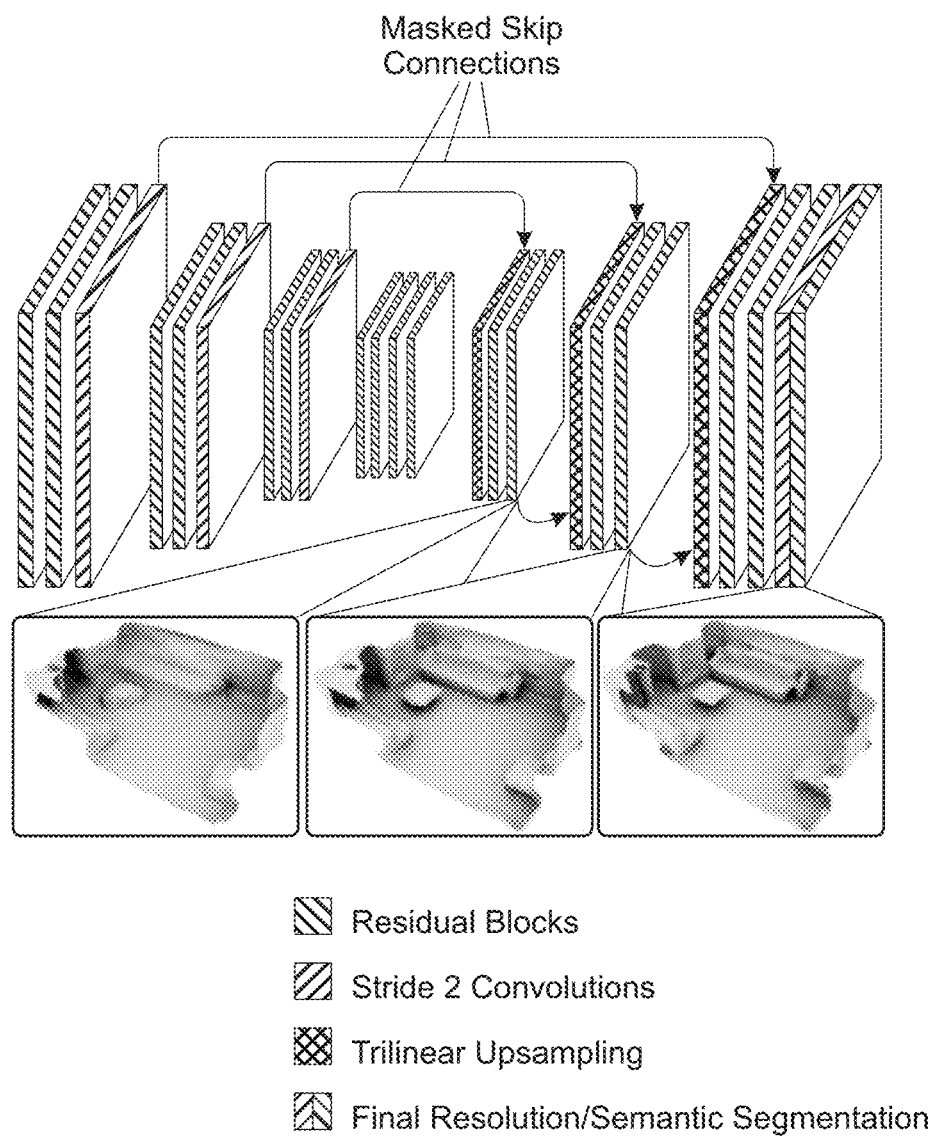
FIG. 5 is a schematic diagram of a 3D encoder decoder architecture, according to one embodiment.

Once the features 124 are accumulated into the 3D voxel volume 126, at step 128, the 3D voxel volume is passed through a 3D convolutional encoder-decoder network 130 to refine the features and regress the output TSDF. Each layer of the encoder and decoder uses a set of 3×3×3 residual blocks. Downsampling may be implemented with 3×3×3 stride 2 convolution, while upsampling may utilize trilinear interpolation followed by a 1×1×1 convolution to change the feature dimension. The feature dimension is doubled with each downsampling and halved with each upsampling. All convolution layers are followed by a Batchnorm (Batch normalization) function and a ReLU (rectified linear unit) function. FIG. 5 illustrates an example of Referring still to FIG. 3, once the image features 120 have been fused into the 3D voxel volume 126, at step 128a, the 3D voxel volume 126 is passed through a 3D CNN 130 to refine the features and directly regress a TSDF 132, using the 3D CNN. This step 128 is depicted in FIG. 5, which schematically shows the encoder-decoder architecture. The 3D CNN predicts TSDFs in a coarse to fine manner with the previous layer being used to sparsify the next resolution. At step 128*b*, the 3D CNN may also include an additional head which predicts semantic segmentation of the features in the 3D voxel volume.

Figures 4A, 4B, 4C:
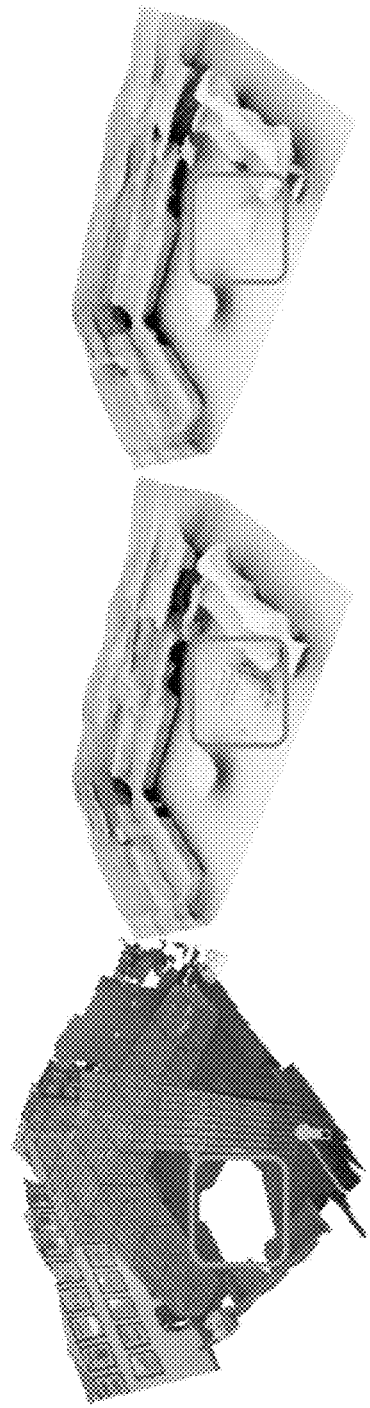
FIGS. 4A-4C illustrate a comparison of a diagram of a back-projection of features into a 3D voxel volume (FIG. 4A), a diagram of the features using naïve skip connections in a 3D CNN (FIG. 4B) and a diagram of the features using masked skip connections to reduce the artifacts and better complete the geometry of unobserved regions (FIG. 4C), according to one embodiment.

Additive skip connections from the encoder to the decoder may also be included in order to complete the geometry in unobserved regions. The encoder features are passed through a 1×1×1 convolution followed by a Batchnorm function and ReLU function. However there may be voxels which were never observed during the sequence and thus do not have any features back-projected into them. The large receptive field of the coarser resolution layers in the network is able to smooth over and infill these areas, but adding zero values from the early layers of the decoder undoes this bringing the zeros back. This significantly reduces the ability of the 3D CNN to complete the geometry in unobserved regions. As such, for these voxels do not use a skip from the encoder. Instead, the decoder features are passed through the same batchnorm function and reLU function to match the magnitude of the standard skip connections and add them. An exemplary skip connection is shown in Equation (5) of FIG. 12, which is quoted below.

$$z = \begin{cases} x + g(f(y)) & y \neq 0 \\ x + g(x) & y = 0 \end{cases} \quad (5)$$

wherein: x is the features from the decoder
y is the features being skipped from the encoder
f is the convolution
g is the batchnorm and relu functions FIGS. 4A-4C illustrate the use of these masked skip connections to complete the geometry of unobserved regions. FIG. 4A illustrates the back-projection of features into the 3D voxel volume, and shows an unobserved region within the overlaid rectangular. FIG. 4B shows how naïve skip connections in 3D CNN lead to significant artifacts. FIG. 4C shows how the masked skip connections reduce the artifacts and allow the 3D CNN to better complete the geometry of unobserved regions.

After the encoder decoder, a 1×1×1 convolution of the 3D CNN followed by a tan h activation is used to regress the final TSDF values 132. In addition, intermediate output heads may be included in the 3D CNN for each resolution prior to upsampling. This is used as intermediate supervision to help the network train faster, as well as guide the later resolutions to focus on refining predictions near surfaces and ignoring large empty regions that the coarser resolutions are already confident about. For the semantic segmentation models, an additional 1×1×1 convolution may be included to predict the segmentation logits (only at the final resolution).

Since the features are back-projected along entire rays, the voxel volume is filled densely and thus the method cannot take advantage of sparse convolutions in the encoder. However, by applying a hard threshold to the intermediate output TSDFs, the decoder can be sparsified allowing for the use of sparse convolutions similar to prior methods. In practice, it was found that the models can be trained at 4 cm3 voxel resolution without the need for sparse convolutions. While the feature volumes are not sparsified, the multi resolution outputs are used to sparsify the final predicted TSDF. Any voxel predicted to be beyond a fixed distance threshold is truncated in the following resolution.

EXAMPLES

The following describes an example use case of the methods for generating a 3D reconstruction of a scene from a sequence of RGB images. A Resnet50-FPN was used followed by the merging the method used in Kirilov, A., Girshick, R., He, K., Dollar, P.: Panoptic feature pyramid networks; Proceedings of the IEEE Conference on Computer Vision and Pattern Recognition; pp. 6399-6408 (2019), with 32 output feature channels as our 2D backbone. The features are back-projected into a 4 cm3 voxel grid. Our 3D CNN consists of a four scale resolution pyramid where we double the number of channels each time we half the resolution. The encoder consists of (1,2,3,4) residual blocks at each scale respectively, and the decoder consists of (3,2,1) residual blocks.

Initially, we train the network end-to-end using short sequences covering portions of rooms, since all frames need to be kept in memory for back propagation. We train with ten frame sequences, an initial learning rate of 1e-3 and a 96×96×56 voxel grid. After 35 k iterations, we freeze the 2D network and fine tune the 3D network. This removes the need to keep all the activations from the 2D CNN in memory and allows for in-place accumulation of the feature volumes, breaking the memory dependence on the number of frames. We fine tune the network with 100 frame sequences, at a learning rate of 4e-4.

At test time, similar to during fine tuning, we accumulate the feature volumes in place, allowing us to operate on arbitrary length sequences (often thousands of frames for Scannet) and we use a 400×400×104 sized voxel grid.

Training the network to completion takes around 36 hours on 8 Titan RTX GPUs with a batch size of 16 and synchronized batchnorm.

Ground Truth Preparation and Loss:

Referring to FIGS. 6A-6E, we supervise the multi scale TSDF reconstructions using l1 loss to the ground truth TSDF values. Following use of the 3D encoder decoder of Dai, A., Qui, C. R., Niebner, M.: Shape completion using 3d-encoder predictor cnns and shape synthesis (2016), we log-transform the predicted and target values before applying the l1 loss, and only backpropagate loss for voxels that were observed in the ground truth (i.e., have TSDF values strictly less than 1). However, to prevent the network from hallucinating artifacts behind walls and outside the room, we also mark all the voxels where their entire vertical column is equal to 1 and penalize in these areas too. The intuition for this is that if the entire vertical column was not observed it was probably not within the room.

Furthermore, to force the finer resolution layers to learn more detail, we only compute the loss for voxels which were not beyond a fraction (0.97) of the truncation distance in the previous resolution. Without this, the later layers loss is dominated by the large number of voxels that are far from the surface and easily classified as empty, preventing it from learning effectively.

To construct the ground truth TSDFs we run TSDF fusion at each resolution on the full sequences, prior to training. This results in less noisy and more complete ground truth than simply fusing the short training batch sequences on the fly. However, this adds the complication that now we have to find the appropriate region of the TSDF for the training batch. We solve this in a two-step process.

During training we crop the relevant portion of this TSDF using the camera frustum.

To crop the relevant portion we first back-project all the depth points from the batch of frames. The centroid of these points is used to center the points in the reconstruction volume. We also apply a random rotation about the vertical axis for data augmentation. If we always center the visible geometry in our volume at training time, the network does not have a chance to learn to not hallucinate geometry far beyond the wall (the network takes advantage of the fact that the bounds of the volume are fit to the visible area). This causes the network to not know what to do when the volume is much larger at test time. As such, after centering, we apply a random shift along the viewing direction of the camera (so the network is forced to learn not to hallucinate geometry behind the visible geometry).

Because even the full ground truth reconstructions are incomplete, we adopt a similar loss scheme to that disclosed in Dai, A., Diller, C., Niebner, M.; SG-nn Sparse generative neural networks for self-supervised scene completion of rgb-d scans, arXiv preprint arXiv:1912.00036 (2019), and only apply the loss where the ground truth TSDF is strictly less than 1 (i.e., known empty voxels (T=−1), and near surface (|T|<1). However we also mark voxels with T=1 that are outside the scene and also penalize on them too, to help with the hallucination problem mentioned above.

We would like the network to learn to complete geometry, but asking it to completely hallucinate geometry that is completely out of view is too hard. As such, we further reduce to the portion of the TSDF that we penalize on by clipping the visible frustum. We construct a mask from the voxels that are visible (T<1) in the batch reconstruction and then dilate it by a few voxels (force the network to complete geometry slightly beyond the visible frustum). Furthermore, any instances that are partially visible are fully included in the mask. This mask is applied to the full TSDF used for training.

Results:

Datasets and Metrics:

We evaluate the Examples on ScanNet, which consists of 2.5M images across 707 distinct spaces. We use the standard train/validation/test splits.

Figure 7:
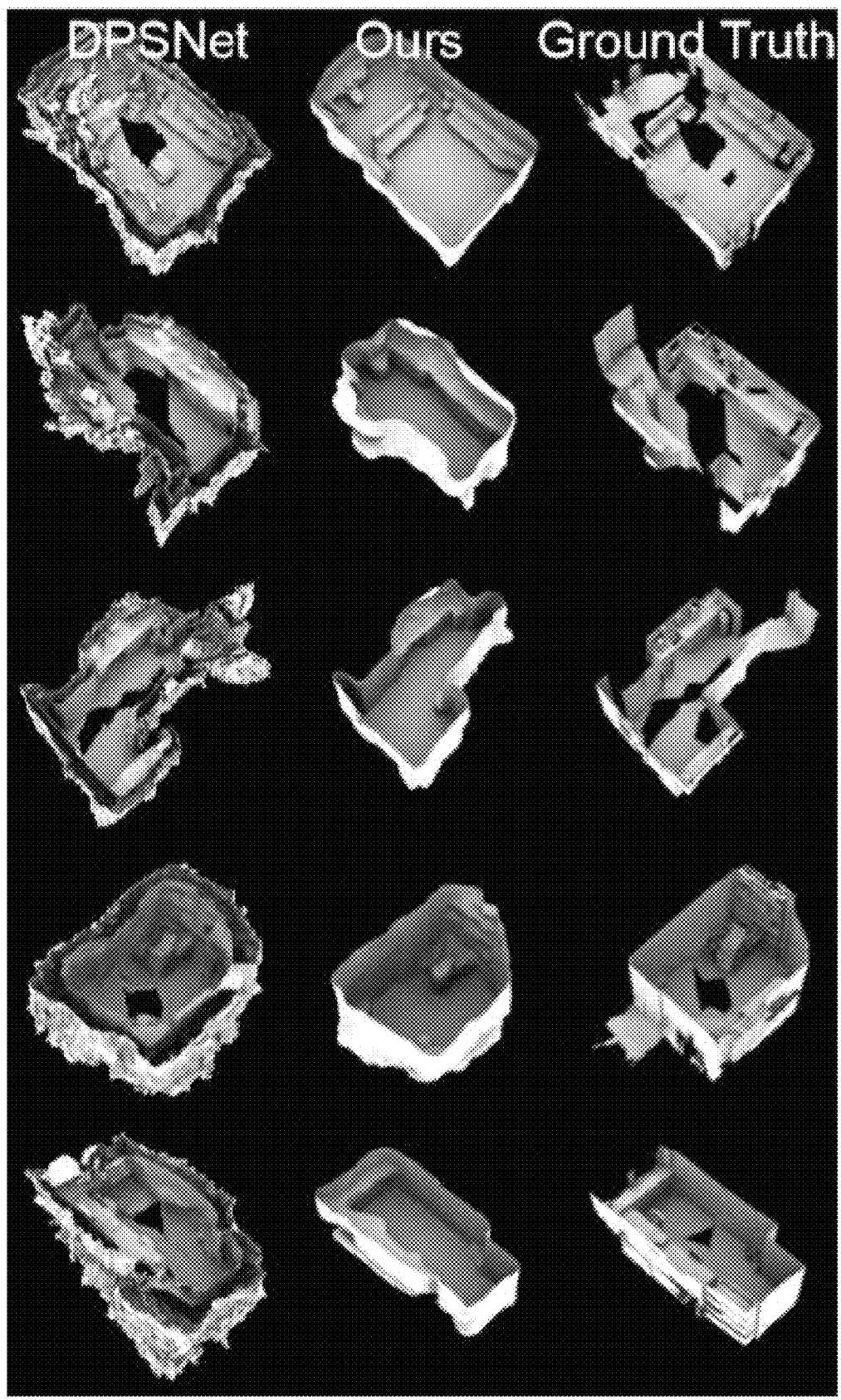
FIG. 7 is a series of images which illustrate a comparison of a 3D reconstruction generated in the described Example according to the methods disclosed herein, with a 3D reconstruction generated using DPSNet, and a Ground Truth.

We evaluate our 3D reconstructions using both standard 2D depth metrics and 3D metrics (see FIG. 9), as well as qualitatively (see FIG. 7). FIG. 9 shows that the 3D reconstructions according to the Example are more accurate in every respect than the 3D reconstructions generated using DPSNet and GPMVS.

Since no prior work attempts to reconstruct full 3D scenes from multiview images, we compare to state-of-the-art multiview stereo algorithms. To evaluate these in 3D we take their outputs and fuse them into TSDFs using standard TSDF fusion.

Figure 8:
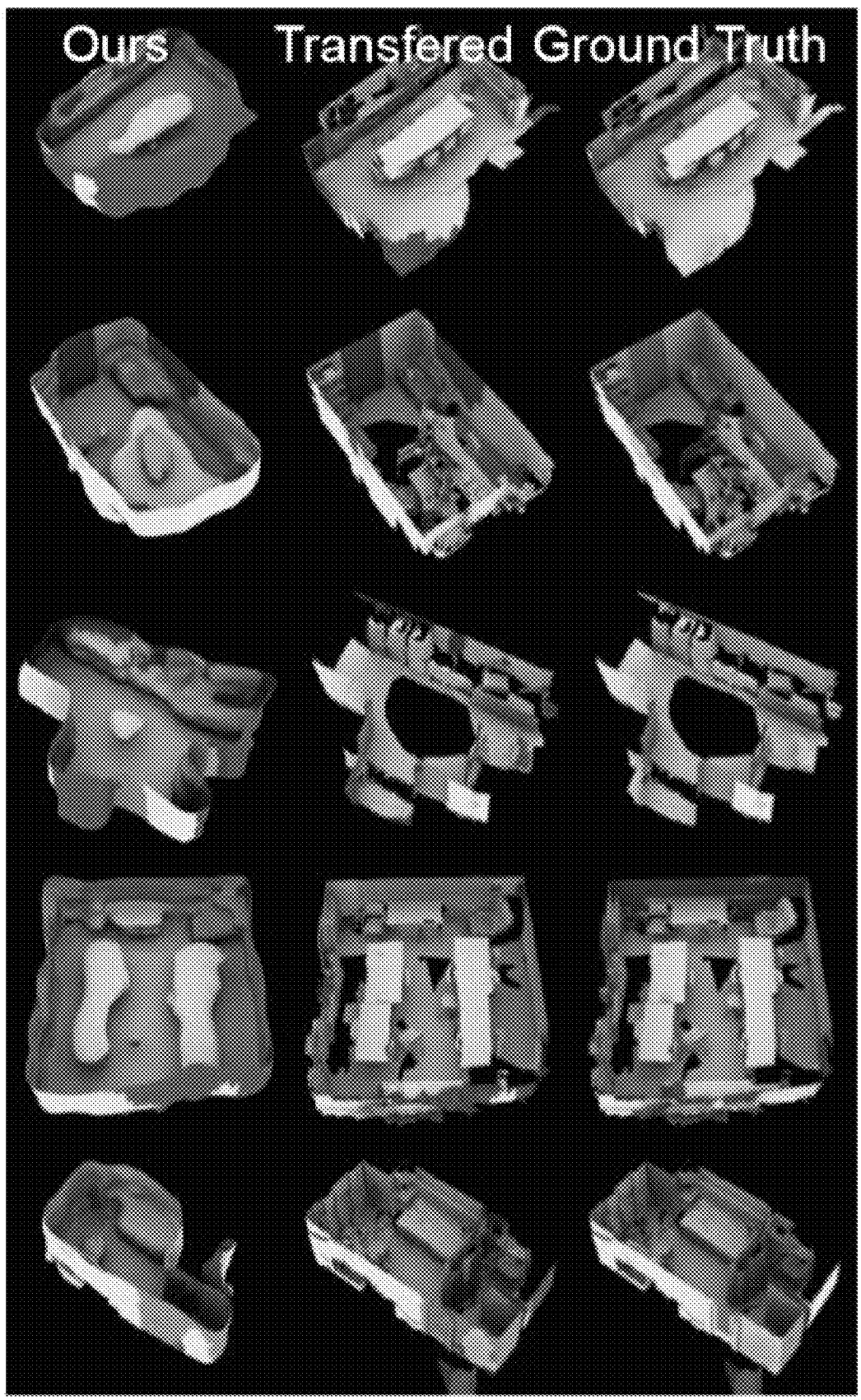
FIG. 8 is a series of images comparing qualitative 3D semantic segmentation labels generated in the described Example according to the methods disclosed herein, against the labels transferred to a Ground Truth, and Ground Truth labels.

We evaluate our semantic segmentation by transferring the labels predicted on our mesh onto the ground truth mesh using nearest neighbor lookup on the vertices, and then report the standard IOU benchmarks defined in Dai, A., Chang, A. X., Savva, M., Halber M., Funkhouser, T., Niebner, M.; Scannet: Richly-annotated 3d reconstructions of indoor scenes; Proc. Computer Vision and Pattern Recognition (CVPR), IEEE (2017), as shown in FIG. 8. FIG. 8 shows that our semantic segmentation according to the method disclosed herein accurately segment the 3D scene without using a depth sensor. No prior work attempts to do 3D semantic segmentation from only RGB images.

CONCLUSIONS

In this work, we present a novel approach to 3D scene reconstruction. Notably, our approach does not require depth inputs; is unbounded temporally, allowing the integration of long frame sequences; predictively completes meshes; and supports the efficient computation of other quantities such as semantics. We hope this work opens another pathway to solving 3D scene reconstruction.

Various example embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Example aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

What is claimed is:

1. A method of generating a three-dimensional (3D) reconstruction of a scene from multiview images, the method comprising:
   obtaining a sequence of frames of red green blue (RGB) images;
   extracting features from the sequence of frames of RGB images using a two-dimensional convolutional neural network (2D CNN);
   back-projecting the features from each frame using known camera intrinsics and extrinsics into a 3D voxel volume wherein each pixel of the voxel volume is mapped to a ray in the voxel volume;
   fusing/accumulating features from each frame into the 3D voxel volume;
   passing the 3D voxel volume through a 3D convolutional neural network (3D CNN) having an encoder-decoder to refine the features in the 3D voxel volume and regress output truncated signed distance function (TSDF) values at each voxel of the 3D voxel volume.

2. The method of claim 1, wherein the frames are fused into a single 3D feature volume using a running average.

3. The method of claim 2, wherein the running average is a simple running average.

4. The method of claim 3, wherein the running average is a weighted running average.

5. The method of claim 1, further comprising:
   after passing the 3D voxel volume through all layers of the 3D CNN, passing the refined features in the 3D voxel volume and TSDF values at each voxel of the 3D voxel volume through a batch normalization (batchnorm) Junction and a rectified linear unit (reLU) function.

6. The method of claim 5, wherein additive skip connections are included from an encoder to a decoder of the 3D CNN, and the method further comprises:
   using the additive skip connections to skip one or more features in the 3D voxel volume from the encoder to the decoder of the 3D CNN.

7. The method of claim 6, wherein one or more null voxels of the 3D voxel volume do not have features back-projected into them corresponding to voxels which were not observed during the sequence of frames of RGB images, and the method further comprises:
   not using the additive skip connections from the encoder for the null voxels;
   passing the null voxels through the batchnorm function and the reLU function to match a magnitude of the voxels undergoing the skip connections.

8. The method of claim 1, wherein the 3D CNN has a plurality of layers each having a set of 3×3×3 residual blocks, and the 3D CNN implements downsampling with 3×3×3 stride 2 convolution and upsampling using trilinear interpolation followed by a 1×1×1 convolution.

9. The method of claim 1, wherein the 3D CNN further comprises an additional head for predicting semantic segmentation, and the method further comprises:
   the 3D CNN predicting semantic segmentation of the features in the 3D voxel volume.

10. The method of claim 1, further comprising training the 2D CNN using short frame sequences covering portions of scenes.

11. The method of claim 10, wherein the short frame sequences include ten or fewer frame sequences.

12. The method of claim 11, further comprising:
    fine tuning the training of the 2D CNN using larger frame sequences having more frame sequences that the short frame sequences.

13. The method of claim 12, wherein the larger frame sequences include 100 or more frame sequences.

14. A cross reality system, comprising:
    a head-mounted display device having a display system;
    a computing system in operable communication with the head-mounted display;
    a plurality of camera sensors in operable communication with the computing system;
    wherein the computing system is configured to generate a three-dimensional (3D) reconstruction of the scene from a sequence of frames of RGB images captured by the camera sensors by a process comprising:
    obtaining a sequence of a frames of red green blue (RGB) images of a scene within a field of view of the camera sensors from the camera sensors;
    extracting features from the sequence of frames of RGB images using a two-dimensional convolutional neural network (2D CNN);
    back-projecting the features from each frame using known camera intrinsics and extrinsics into a 3D voxel volume wherein each pixel of the voxel volume is mapped to a ray in the voxel volume;
    fusing the features from each frame into the 3D voxel volume;
    passing the 3D voxel volume through a 3D convolutional neural network (3D CNN) having an encoder-decoder to refine the features in the 3D voxel volume and regress output truncated signed distance function (TSDF) values at each voxel of the 3D voxel volume.

15. The system of claim 14, wherein the frames are fused into a single 3D feature volume using a running average.

16. The system of claim 15, wherein the running average is a simple running average.

17. The system of claim 16, wherein the running average is a weighted running average.

18. The system claim 14, wherein the process for generating a three-dimensional (3D) reconstruction of the scene from the sequence of frames of RGB images further comprises:
    after passing the 3D voxel volume through all layers of the 3D convolutional encoder-decoder, passing the refined features in the 3D voxel volume and TSDF values at each voxel of the 3D voxel volume through a batch normalization (batchnorm) function and a rectified linear unit (reLU) function.

19. The system of claim 18, wherein skip connections are included from an encoder to a decoder of the 3D CNN, and the process for generating a three-dimensional (3D) reconstruction of the scene from the sequence of frames of RGB images further comprises:
  using the additive skip connections to skip one or more features in the 3D voxel volume from the encoder to the decoder of the 3D CNN.

20. The system of claim 19, wherein one or more null voxels of the 3D voxel volume do not have features back-projected into them corresponding to voxels which were not observed during the sequence of frames of RGB images, and the process for generating a three-dimensional (3D) reconstruction of the scene from the sequence of frames of RGB images further comprises:
  not using the additive skip connections from the encoder for the null voxels;
  passing the null voxels through the batchnorm function and the reLU function to match a magnitude of the voxels undergoing the skip connections.

21. The system of claim 14, wherein the 3D CNN further comprises an additional head for predicting semantic segmentation, and the method further comprises:
  the 3D CNN predicting semantic segmentation of the features in the 3D voxel volume.

\* \* \* \* \*